Patented Mar. 21, 1939

2,151,185

UNITED STATES PATENT OFFICE 2,151,185

ESTERS OF GLYCOL MONOESTERS AND ACYLATED HYDROXY ACIDS

Thomas F. Carruthers, South Charleston, and Charles M. Blair, Charleston, W. Va., assignors to Carbide and Carbon Chemicals Corporation, a corporation of New York No Drawing. Application January 16, 1936, Serial No. 59,406

14 Claims. (Cl. 260—484)

The invention relates to new chemical compounds comprising esterification products of a glycol monoester and an acylated hydroxy acid. It has particular reference to ester compositions formed by the reaction of a carboxylic acid monoester of an alkylene or polyalkylene glycol, a hydroxy monobasic or polybasic acid, and an aliphatic monocarboxylic acid, or its anhydride.

These new esters are stable liquid compositions having properties of value as solvents and plasticizing agents in lacquers and plastic compositions employing cellulose derivatives, or natural and synthetic gums and resins.

From their method of preparation, the nature and structure of the compounds will be quite evident. This consists preferably in a reaction of two steps, in which a glycol monoester is first reacted with a hydroxy monobasic or polybasic acid, to effect esterification of each carboxyl group of the acid. The hydroxyl groups of the acid radical are then acylated by further reaction with a suitable acyl group, to produce a stable mixed ester compound. The hydroxy acids suitable in this reaction will include those containing one or more hydroxyl groups, and which are monobasic or polybasic in nature. Representative of these are lactic, glycolic, malic, citric, tartaric among the aliphatic acids, as well as salicylic, hydroxynaphthoic and similar aromatic derivatives. Aliphatic monocarboxylic acid monoesters of both the alkylene and polyalkylene glycols will function as described. Many of these are known, such as the monoacetate and monobutyrate ester of ethylene glycol, propylene glycol, diethylene glycol, and the like. For the acylation of the hydroxy acid ester, acetic acid, butyric acid, or other lower aliphatic monobasic acids, as well as their anhydrides may be used. Aromatic monobasic acids, such as benzoic or naphthoic acids, are suitable, and certain acylating agents other than carboxylic compounds may be used. For example, acid halides, including acetyl chloride and benzoyl chloride, or metallic salts of monobasic acids may be employed in methods customary in the art.

Specific ester compositions embodied by the invention, and their method of preparation, are shown in the following examples.

Example I

Diethylene glycol monoacetate in an amount of 2440 grams (16.5 mols) was heated with 1125 grams (7.5 mols) of tartaric acid in the presence of sulfuric acid as a catalyst, and with benzene as the water-removing agent. The maximum reaction temperature was 159° C. To 1866 grams of this first reaction product there was then added 856 grams of acetic anhydride, and the mixture was heated to 135° C. for two hours. After removing excess acetic anhydride and acid by vacuum distillation, the crude product was neutralized by washing with aqueous sodium carbonate solution. It was then washed twice with water, and dried by heating under reduced pressure. The final, completely esterified product was a straw colored, very viscous liquid, insoluble in water. The saponification equivalent was 84.5, and the molecular weight 470, as determined by elevation of boiling point. This ester may be called di-(diethylene glycol monoacetate) diacetyl tartrate.

Example II

By a procedure substantially similar to the above example, 383 grams (2.6 mols) of propylene glycol monobutyrate were heated with 278 grams (2.6 mols) of 85% lactic acid in the presence of anhydrous aluminum sulfate as a catalyst. The maximum reaction temperature is 95° C. The entire product was then further heated to 110° C. for 1.5 hours with 420 grams (2.7 mols) of butyric anhydride. The final product, obtained by distillation under reduced pressure, was a water-white liquid of a faint pleasant odor. It had a specific gravity of 1.054 at 20°/20° C., a saponification equivalent of 97.3, and a boiling point of 122° C. at 3 mm. pressure. This ester compound may be named propylene glycol monobutyrate butyryl lactate.

Example III

Ethylene glycol monoacetate lactate was prepared in a manner similar to that described above. To 185 grams of this ester were slowly added 140 grams of benzoyl chloride at a temperature of 50° C. This reaction mixture was then heated for an hour at 100° to 110° C., and thereafter neutralized by agitating it with an aqueous solution of sodium carbonate.

Distillation of the neutralized reaction mixture under reduced pressure yielded the final product, which, when isolated, was a water-white, water-insoluble, viscous liquid. The new ester may be termed ethylene glycol monoacetate benzoyl lactate. This ester boiled at 205° to 210° C. at 10 mm. pressure, and had a specific gravity of 1.200 at 20°/20° C. The identity of the ester was verified by its saponification equivalent of 92.2.

The above examples are representative of many other compounds of the class embodied in this invention. The process as shown for preparing them, may be modified to suit the particular reactants employed, and the invention should not be limited other than as defined in the appended claims.

We claim:

1. As chemical compounds, esterification products of an aliphatic monocarboxylic acid monoester of a glycol of the group consisting of alkylene and polyalkylene glycols, and an acylated hydroxy acid, wherein the acylating radical corresponds to a monocarboxylic acid.

2. As chemical compounds, esters of hydroxy carboxylic acids, in which the hydrogen of each carboxyl group is replaced with the radical of an aliphatic monocarboxylic acid monoester of a glycol of the group consisting of alkylene and polyalkylene glycols, and in which the hydrogen of each hydroxyl group is substituted by an acyl radical corresponding to a monocarboxylic acid.

3. As chemical compounds, esters of hydroxy carboxylic acids, in which the hydrogen of each carboxyl group is replaced with the radical of an aliphatic monocarboxylic acid monoester of a glycol of the group consisting of alkylene and polyalkylene glycols, and an aliphatic monocarboxylic acyl radical is substituted for the hydrogen of each hydroxyl group.

4. As chemical compounds, esters of hydroxy carboxylic acids, in which the hydrogen of each carboxyl group is replaced with the monoacetate ester radical of a glycol of the group consisting of alkylene and polyalkylene glycols, and an aliphatic monocarboxylic acyl radical is substituted for the hydrogen of each hydroxyl group.

5. As chemical compounds, esters of hydroxy carboxylic acids, in which the hydrogen of each carboxyl group is replaced with the monobutyrate ester radical of a glycol of the group consisting of alkylene and polyalkylene glycols, and an aliphatic monocarboxylic acyl radical is substituted for the hydrogen of each hydroxyl group.

6. As chemical compounds, esters of hydroxy carboxylic acids, in which the hydrogen of each carboxyl group is replaced with the radical of an aliphatic carboxylic acid monoester of diethylene glycol, and a monocarboxylic acyl radical is substituted for the hydrogen of each hydroxyl group.

7. As chemical compounds, esters of hydroxy carboxylic acids, in which the hydrogen of each carboxyl group is replaced with the radical of an aliphatic carboxylic acid monoester of propylene glycol, and a monocarboxylic acyl radical is substituted for the hydrogen of each hydroxyl group.

8. As a chemical compound, an ester of tartaric acid, in which the hydrogen of both carboxyl groups is replaced with a diethylene glycol monoacetate radical, and an acetyl radical is substituted for the hydrogen of both hydroxyl groups.

9. As a chemical compound, an ester of lactic acid, in which the hydrogen of the carboxyl group is replaced with a propylene glycol monobutyrate radical, and a butyryl radical is substituted for the hydrogen of the hydroxyl group.

10. As a chemical compound, an ester of lactic acid, in which the hydrogen of the carboxyl group is replaced with an ethylene glycol monoacetate radical, and a benzoyl radical is substituted for the hydrogen of the hydroxyl group.

11. As a chemical compound, di-(glycol monoacetate) diacetyl tartrate.

12. Process for making esterification products, which comprises reacting an aliphatic monocarboxylic acid monoester of a glycol of the group consisting of alkylene and polyalkylene glycols with a hydroxy carboxylic acid, and subsequently acylating the reaction product with an acylating agent corresponding to a monocarboxylic acid.

13. Process for making esterification products, which comprises reacting an aliphatic monocarboxylic acid monoester of a glycol of the group consisting of alkylene and polyalkylene glycols with an aliphatic hydroxy carboxylic acid, and subsequently acylating the reaction product with an acylating agent corresponding to a monocarboxylic acid.

14. Process for making esterification products, which comprises reacting an aliphatic monocarboxylic acid monoester of a glycol of the group consisting of alkylene and polyalkylene glycols with an aliphatic hydroxy carboxylic acid, and subsequently acylating the reaction product with an aliphatic monocarboxylic acid.

THOMAS F. CARRUTHERS.
CHARLES M. BLAIR.